though it is believed to show the preferred embodiment.

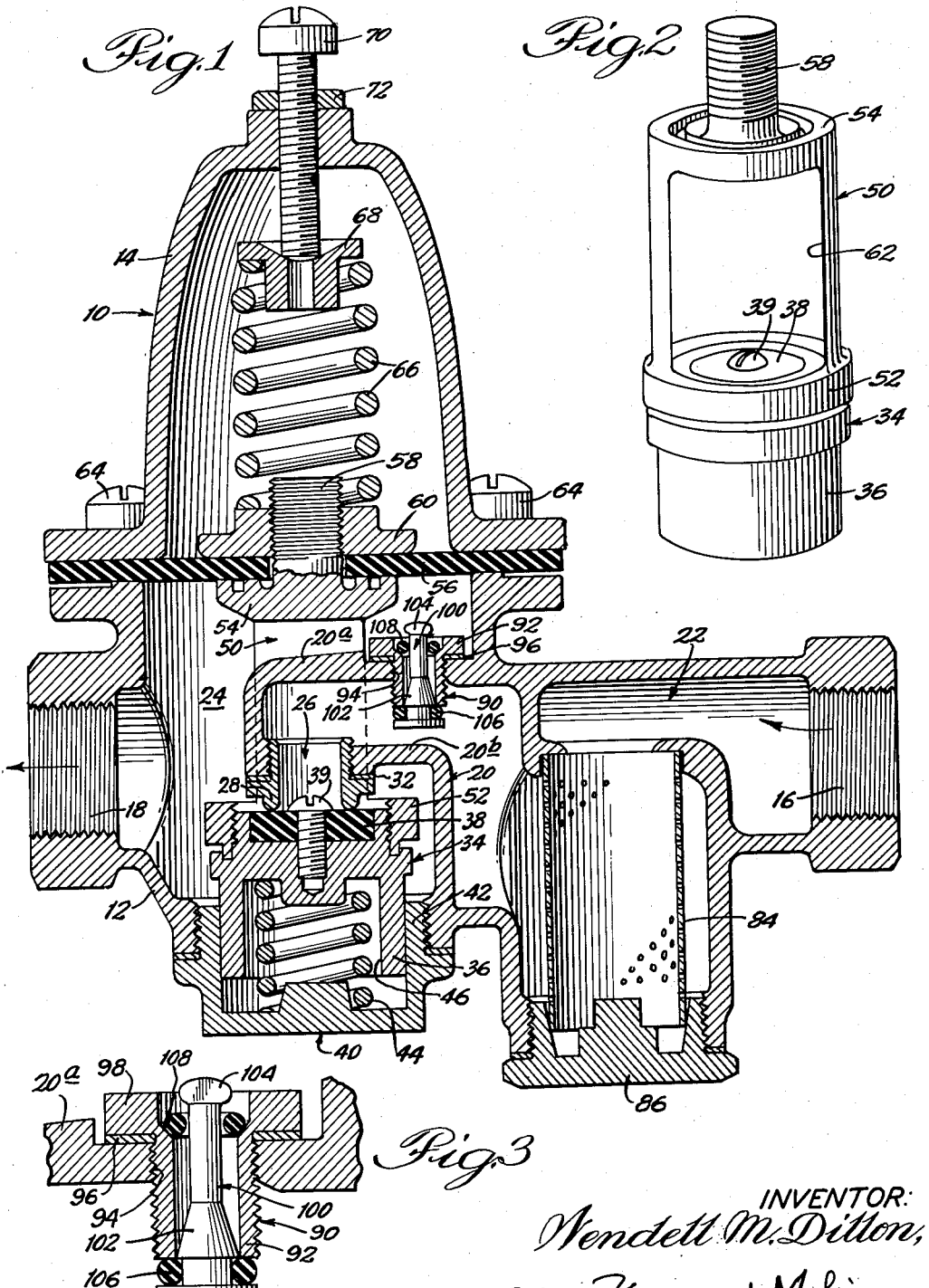

United States Patent Office 3,115,154
Patented Dec. 24, 1963

3,115,154
PRESSURE REGULATOR WITH INTEGRAL RELIEF VALVE
Wendell M. Dillon, North Andover, Mass., assignor to Watts Regulator Company, Lawrence, Mass., a corporation of Massachusetts
Filed Dec. 27, 1960, Ser. No. 78,732
1 Claim. (Cl. 137—493.8)

This invention relates to fluid pressure regulators, and more particularly to a pressure regulator that has provided, integral therewith, a reverse-flow-pressure relief valve for relieving excessive pressure on the demand or downstream side of the regulator.

In areas where the supply water pressure is high, the general practice is to install a pressure regulator, or water-pressure-reducing valve, to limit the pressure in the building service pipes to some lower pre-selected pressure. The installation of a pressure-reducing valve creates what is termed a closed system. The pressure-reducing valve permits water to flow into the building service pipes until the pressure therein reaches the predetermined set pressure of the reducing valve, at which time it closes tightly. The building system is then closed, and any increase in volume due to thermal expansion of the water in the pipes increases the pressure in the system, since the water cannot escape back into the main, or supply line, through the closed reducing valve.

To protect the system against damaging pressures due to thermal expansion, such as may result from heating water in a water heater connected in the system, means for relieving the pressure on the downstream side of the pressure-reducing valve must be provided. Frequently, pressure relief valves are installed, and they allow water to escape from the system at some predetermined pressure to accommodate the expansion. This release of water from the system may occur frequently and is often a nuisance, and, furthermore, such valves require attention to insure that they continue to function properly.

Another solution to the problem is the use of a reverse flow by-pass line around the water-pressure-reducing valve, with a check valve in the by-pass line that opens into the water supply main. The check valve is normally closed but permits water to escape therethrough when thermal expansion increases the pressure on the downstream side of the reducing valve to slightly above street pressure. The objection to this system is that it requires a separate line and a check valve separate from the pressure-reducing valve, all of which increases cost and space occupied by the installation.

The present invention is based upon the appreciation that the amount of water which need escape from the building system, so as to accommodate thermal expansion, is relatively small, so that only a small pressure relief valve is necessary. The basic concept of the invention is to provide a reverse flow relief valve that is integral with the pressure regulator, and this constitutes the principal object of the invention.

A particular object is to provide a water-pressure-reducing valve having a reverse flow check valve therein mounted between the supply side and the demand side of the reducing valve.

A further object is to provide a diaphragm type pressure regulator having integral therewith a demand pressure relief valve.

An additional object is to provide a water-pressure-reducing valve having a built-in demand pressure relief valve which is especially suited for residential use owing to its simple, compact and economical construction and its reliability in operation, and which provides under many conditions of operation a means of releasing fluid expansion back into the system so that the incidence of relief valve spillage will be reduced or completely eliminated in some cases.

These and additional objects, advantages and functions of the invention will be apparent on reference to the specification and to the attached drawings, in which:

FIGURE 1 is a vertical axial cross-sectional view of a fluid pressure regulator which represents a preferred embodiment of the invention;

FIGURE 2 is an enlarged perspective view of the yoke which connects the diaphragm and the flow valve in the embodiment of FIGURE 1; and FIGURE 3 is an enlarged vertical cross-sectional view of the integral pressure relief valve shown in the combination illustrated in FIGURE 1.

The invention is directed to improvements in a fluid pressure regulating valve of the type which includes a valve casing having a supply side, a demand side, and partition means therebetween. The regulating valve includes flow-valve port means in the partition means, and flow-valve control means cooperating with the port means. A pressure responsive means is also included, which is responsive to the demand pressure, for adjusting the flow valve control means relative to the valve port means.

In the improved combination of this invention, relief-valve port means are provided in the partition means, and reverse-flow check-valve means are provided which cooperate with the relief-valve port means. The check-valve means are adapted for opening the relief-valve port means when the pressure on the downstream side of the regulating valve exceeds the supply pressure at the inlet of the pressure-reducing valve.

Referring now to the drawings, a single-ported fluid pressure regulator, or regulating valve, is generally indicated at 10, which includes a generally hollow valve casing 12 and a hollow diaphragm assembly casing, or bonnet, 14. The valve casing includes a supply side, or inlet, 16 and a demand side, or outlet, 18. The sides are separated by internal partition means in the form of a goosenecked wall 20, which is shaped to define an upper lateral wall portion 20a and a lower lateral wall portion 20b, and which wall 20 divides the casing into an upstream supply chamber 22 and a downstream demand chamber 24.

The flow port 26 of the valve is defined by a tubular insert 28 that is threaded into wall portion 20b. An appropriate sealing gasket 32 is provided. The valving member 34 for port 26 is positioned below insert 28 and includes recessed disc holder 36, and an annular sealing disc 38 secured in disc holder 36 by means of a control screw 39. A closure plug 40 with an annular sleeve portion 42 is threaded into valve casing 12 below valving member 34. Valving member 34 slidably enters sleeve portion 42, and a restoring compression coil spring 44 is positioned between plug 40 and valving member 34.

The valve member 34 is connected by a control yoke 50 to a pressure-responsive diaphragm assembly for movement therewith. The yoke 50 has, at its lower end, a female threaded ring 52 which threadably connects to disc holder 36, and has, at its upper end, an annular abutment shoulder 54 for engagement with the underside of an annular flexible diaphragm member 56. The yoke carries a central threaded stud 58 which extends through diaphragm 56 and receives thereon a plate, or nut, 60 which clamps the diaphragm 56 between itself and shoulder 54. The central portion of yoke 50 is apertured, or recessed, at 62 to accommodate, or straddle, the gooseneck part of the partition wall 20.

The diaphragm 56 is secured between bonnet 14 and valve casing 12 by means of a plurality of assembly screws 64. Diaphragm 56 thus partially closes off demand chamber 24 and is positioned to be subjected to the pressure in the demand chamber. As pressure in chamber 24 falls, the diaphragm 56 flexes downward to unseat valve disc 38 and permit flow from the supply side 16. As pressure in chamber 24 rises, the diaphragm 56 moves upward to seat valve disc 38 and interrupt flow from supply side 16.

The bonnet 14 encloses a diaphragm adjustment which includes elongated compression coil spring 66 which bears at its lower end on nut 60 and engages, at its upper end, annular abutment member 68. The spring force is varied by an elongated selectively operated, headed, adjusting screw 70 carried by bonnet 14 and the tip of which engages abutment member 68 for selective movement toward and away from nut 60. A jam nut 72 provides for locking the screw 70 in a selected position. By varying the force of spring 66 one may pre-select the pressure in the demand chamber 24 at which the valve disc 38 will close port 26.

The water-pressure-reducing valve includes an annular sleeve strainer 84 mounted in the flow path in the supply chamber 22. A closure-plug 86 is secured below the strainer, and permits of selective removal of the strainer 84 for purposes of servicing.

A reverse flow pressure-relief-valve is incorporated in the pressure regulator thus far described. The relief-valve is located wholly within the pressure regulator and is integral therewith. In the preferred embodiment, the relief-valve assembly, generally indicated at 90, is provided in the upper partition wall portion 20a. The relief-valve includes an annular valve seat member 92 which is threaded into an opening 94 in wall portion 20a. A sealing gasket 96 is provided between the wall 20a and an annular flange 98 on the valve seat.

A reverse flow check-valve 100 is positioned in the central bore of the tubular valve seat member 92. The check-valve includes an upright elongated stem 102 positioned centrally in tubular member 92 and spaced from the walls of member 92. The stem 102 has an enlarged frusto-conical lower end extending below the lower edge of valve seat member 92 on the supply side of the valve, and a laterally enlarged, flattened, support part 104 at its upper end extending through the opposite end of the valve seat member 92. The part 104 acts as a key to prevent the stem from dropping through the bore of member 92. The lower end of stem 102 is circumferentially recessed to receive therein an O-ring seal member 106 that is positioned to engage the lower edge of tubular member 92 to close the check-valve. A flexible, annular, cushioning member 108 extends between the underside of part 104 and the inner wall of the valve seat member 92, and is spaced from stem 102 to permit flow between member 108 and stem 102. The cushioning member 108 serves as a silencer to prevent a clicking noise when the valve 100 drops open, and as would occur if part 104 struck valve seat member 92.

Normally, with the supply line pressure which exists in the supply chamber 22 being greater than the system pressure which exists in the demand chamber 24, the check-valve 100 is lifted until the O-ring 106 contacts the valve seat 92, which closes the valve. When the demand pressure increases to slightly above the supply pressure, due to the thermal expansion of the water, the check valve 100 drops, the O-ring seal 106 falls away from the valve seat, and the support part 104 of the valve stem rests on the cushioning member 108. At this time an open fluid path exists through the tubular opening in the valve seat 92 and around the valve 100. Consequently, water moves in reverse flow from the demand chamber 24 through the relief valve and into the supply chamber 22 to relieve the pressure. When the pressure has dropped sufficiently, the relief valve again closes.

The foregoing construction is simple and reliable and readily relieves the excess pressure. The water passing through the relief valve is released into the main line, rather than outside of the system as is the case with conventional relief valves. No additional connections or fittings are required. In this manner, the invention provides a new and improved fluid pressure regulating valve which includes an integral reverse flow relief-valve. The invention is especially useful in residential installations and in connection with the valve types and sizes employed for reducing the pressure from the water main.

While a preferred embodiment of the invention has been described and illustrated, it will be apparent that various changes and modifications can be made in the relief valve within the scope of the invention. Likewise, the construction of the pressure regulator may be varied, and the relief valve may be arranged therein in other equivalent ways. It is intended that such changes and modifications be included within the scope of the appended claim.

What I claim as new, and desire to secure by Letters Patent of the United States is:

In a liquid pressure regulating valve for use in an automatic system wherein undesirable pressure build-up may occur on the demand side of the valve due to thermal expansion of the liquid, where it is necessary to relieve such undesirable pressure build-up and where it is essential that operation of the valve be essentially tamper-proof to manual manipulation and where said valve includes a valve casing having a supply side, a demand side, and partition wall means therebetween located wholly within the valve casing, means defining a flow opening in said partition wall means, flow valve means cooperating with said flow opening, and means responsive to the pressure on the demand side for adjusting said flow valve means relative to said flow opening; the improved combination including means defining a second opening in said partition wall means within said valve casing arranged to effect communication between said supply side and demand side, and reverse flow control means located wholly within the valve casing and operatively associated with said second opening, said control means comprising an elongated, upright valve stem positioned to extend coaxially through said second opening to define a substantially annular flow passageway therebetween and having the ends of the stem disposed on opposite sides of said partition wall means and an O-ring carried on said stem for sealing against liquid flow through said second opening, and said control means being constructed and arranged to be responsive solely to liquid pressure conditions existing within the casing, and not responsive to stimuli exterior of the casing, to prevent liquid flow through said second opening when the liquid pressure on the supply side exceeds the liquid pressure on the demand side and to permit liquid flow through said second opening when the liquid pressure on the demand side exceeds the liquid pressure on the supply side.

References Cited in the file of this patent

UNITED STATES PATENTS

| | | |
|---|---|---|
| 179,467 | Averell | July 3, 1876 |
| 2,113,108 | Conde | Apr. 5, 1938 |
| 2,912,002 | Miller | Nov. 10, 1959 |

FOREIGN PATENTS

| | | |
|---|---|---|
| 178,683 | Great Britain | Mar. 19, 1921 |